United States Patent [19]

Kircher et al.

[11] Patent Number: 4,729,611
[45] Date of Patent: Mar. 8, 1988

[54] VEHICULAR HYDRAULIC BRAKE SYSTEM WITH ANTI-LOCKING ARRANGEMENT

[75] Inventors: Dieter Kircher; Horst P. Becker, both of Frankfurt am Main, Fed. Rep. of Germany

[73] Assignee: Alfred Teves GmbH, Frankfurt am Main, Fed. Rep. of Germany

[21] Appl. No.: 847,641

[22] Filed: Apr. 3, 1986

[30] Foreign Application Priority Data

Apr. 3, 1985 [DE] Fed. Rep. of Germany ....... 3512111
Nov. 30, 1985 [DE] Fed. Rep. of Germany ....... 3542419

[51] Int. Cl.$^4$ .................. B60T 8/32; B60T 8/44
[52] U.S. Cl. .................... 303/116; 60/547.1; 60/591; 188/358; 303/114; 303/119
[58] Field of Search .................. 303/113–119, 303/50–56, 61–63, 68–69, 100, 92, 6 C; 60/545, 550, 547.1, 548, 562, 552, 582, 555–559, 565–566, 568–569, 574–578, 579, 581, 586, 591; 188/355–359, 181, 345

[56] References Cited

U.S. PATENT DOCUMENTS

| | | | |
|---|---|---|---|
| 4,415,210 | 11/1983 | Belart et al. | 303/6 C X |
| 4,416,491 | 11/1983 | Belart et al. | 303/113 |
| 4,483,144 | 11/1984 | Steffes | 60/548 |
| 4,492,413 | 1/1985 | Belart et al. | 303/92 |
| 4,523,792 | 6/1985 | Belart et al. | 303/114 X |
| 4,555,144 | 11/1985 | Belart et al. | 303/119 X |
| 4,578,951 | 4/1986 | Belart et al. | 60/545 |
| 4,598,955 | 7/1986 | Belart et al. | 60/591 X |
| 4,624,108 | 11/1986 | Leiber | 60/591 X |
| 4,629,258 | 12/1986 | Resch et al. | 303/114 X |
| 4,643,489 | 2/1987 | Reinartz et al. | 303/114 |
| 4,659,152 | 4/1987 | Reinartz et al. | 303/114 |
| 4,660,898 | 4/1987 | Steffes | 303/119 X |
| 4,662,688 | 5/1987 | Reinartz | 303/114 |

FOREIGN PATENT DOCUMENTS

| | | |
|---|---|---|
| 2344969 | 3/1974 | Fed. Rep. of Germany . |
| 3040548 | 5/1982 | Fed. Rep. of Germany . |
| 3040562 | 5/1982 | Fed. Rep. of Germany . |
| 3247497 | 6/1984 | Fed. Rep. of Germany . |
| 3338249 | 5/1985 | Fed. Rep. of Germany . |
| 2132718 | 7/1984 | United Kingdom . |
| 2148428 | 5/1985 | United Kingdom ......... 303/114 |
| 2148430 | 5/1985 | United Kingdom ......... 303/119 |

Primary Examiner—Douglas C. Butler
Attorney, Agent, or Firm—James B. Raden; Robert P. Seitter

[57] ABSTRACT

A vehicular hydraulic brake system with an anti-locking arrangement, wherein first valve devices (10, 16, 17, 20, 27, 28, 29, 30) are interposed between a master cylinder (3) and brake-actuating member (11, 12, 13, 14) which valve allow interruption of the supply of pressure fluid to the brake-actuating members (11, 12, 13, 14) and to removal of pressure fluid from brake-actuating members (11, 12, 13, 14). The first valve devices (10, 16, 17, 20, 27, 28, 29, 30) are controllable by a slip-monitoring electronics (18) as a function of the wheel rotational behavior, and provision is made of a device for ensuring availability of a minimum stroke of the master cylinder (3) as a reserve. A shut-off valve (9, 15) is interposed between the master cylinder (3) and the first valve devices (10, 16, 17, 20, 27, 28, 29, 30), and the connection between shut-off valve (9, 15) and the first valve devices is connectible by way of second valve (24, 25) to an auxiliary pressure source (22) which supplies pressure proportional to the pedal force (F).

5 Claims, 2 Drawing Figures

VEHICULAR HYDRAULIC BRAKE SYSTEM WITH ANTI-LOCKING ARRANGEMENT

BACKGROUND OF THE INVENTION

The present invention relates to a vehicular hydraulic brake system with an anti-locking arrangement wherein first valve means are interposed between a master cylinder and brake-actuating members. The valve means allow interruption of a supply of pressure fluid to the brake-actuating members and removal of pressure fluid from the brake-actuating members. The first valve means is controllable by a slip-monitoring electronics in dependence upon the wheel rotational behavior, and a device for safeguarding availability of a minimum stroke as a reserve is provided.

A vehicular hydraulic brake system having these features is known from German printed and published patent application No. 30 40 562.0. A component of the known vehicular brake system is a hydraulic power booster with a tandem master cylinder connected downstream thereof. As a function of the force exerted on the brake pedal, hydraulic pressure is built up in the pressure chamber of the hydraulic power booster which, after having overcome the friction caused by the seals, provides that the booster piston displaces in the actuating direction. As a result thereof, the working chambers of the tandem master cylinder also will be pressurized. Wheel brakes are connected to the working chambers of the tandem master cylinder. Arranged between the working chambers of the tandem master cylinder and the wheel brakes are electromagnetically actuatable valves, which shut off the connection between the working chamber and the respective wheel brake and which permit removal of pressure fluid from the wheel brakes for the purpose of a pressure decrease in the wheel brakes and to return the fluid to an unpressurized supply reservoir.

The hydraulic power booster of the brake system described further comprises a so-called resetting sleeve which by way of corresponding valve means, can be acted upon during control in the direction of brake release by the presure that is in each case prevailing in the pressure chamber of the hydraulic power booster. The dimensions of the resetting sleeve and of the booster piston are conformed to one another in a fashion so as to allow the resetting sleeve to move into abutment on the booster piston under specific conditions. Thus, when pressurized appropriately, the resetting sleeve generates a force in the direction of brake release which confines the travel of the booster piston to a predefinable extent and which, in case of need, ensures that the booster piston is displaced in the direction of brake release. Thus, the necessary reserve volume is preserved in the working chambers of the tandem master cylinder also during brake slip control.

The brake system described affords very reliable operation, but—as explained—there is need for separate component (resetting sleeve), by means of which a minimum stroke as a reserve of the pistons of the tandem master cylinder is safeguarded.

An anti-lock vehicular brake system (German patent specification No. 23 44 969) is also known, wherein a hydraulic brake power booster is provided. In the booster chamber controlled pressure prevails which, in case of slip control, can be delivered to the brake circuits by way of valve means. However, this known brake system nevertheless requires a hydraulic brake power booster.

Therefore, it is an object of the present invention to provide upon a vehicular hydraulic brake system with an anti-locking arrangement of the type initially referred to such as to reduce manufacturing efforts and to attain a solution which is more favorable in terms of cost. In addition, the system is to be compatible with units comprising a braking pressure generator with a vacuum brake power booster.

SUMMARY OF THE INVENTION

This object is achieved according to the instant invention in that a shut-off valve is arranged between the master cylinder and the first valve means. The connection between the shut-off valves and the first valve means is connectible by way of second valve means to an auxiliary pressure source which supplies pressure proportional to the pedal force. One embodiment affords the special advantage in that the resetting sleeve known from the prior art becomes superfluous. In a simple fashion, the second valve means permits hydraulically shut off the working chambers of the master cylinder upon the commencement of control so that likewise depression of the brake pedal through its full travel on pressure fluid removal from the brake-actuating members is prevented and a minimum stroke is ensured as a reserve.

In one embodiment of the present invention, the shut-off valve is controllable electromagnetically. Herein, the control of the shut-off valve is performed by a slip-monitoring electronics, and a change-over signal is issued to the shut-off valve as soon as braking with slip control commences. Further, it is provided that the master cylinder contains several working chambers, with one shut-off valve being connected downstream of each of the working chambers. A multiple-circuit brake system is accomplished this way which afford greater reliability in the operation of an automotive vehicle.

Advantageously, the inventive brake system is designed such that, as an auxiliary-pressure source, an electromotively drivable pressure fluid pump is used which can be put into operation in need of control by a slip-monitoring electronics and which is in a position to constantly top up the pressure fluid removed from the brake-actuating members, provided that the first valve means adopts a corresponding switch position.

BRIEF DESCRIPTION OF THE DRAWING

One embodiment of the instant invention will be described hereinbelow in more detail with reference to the accompanying drawing wherein.

DETAILED DESCRIPTION

Figure 1:
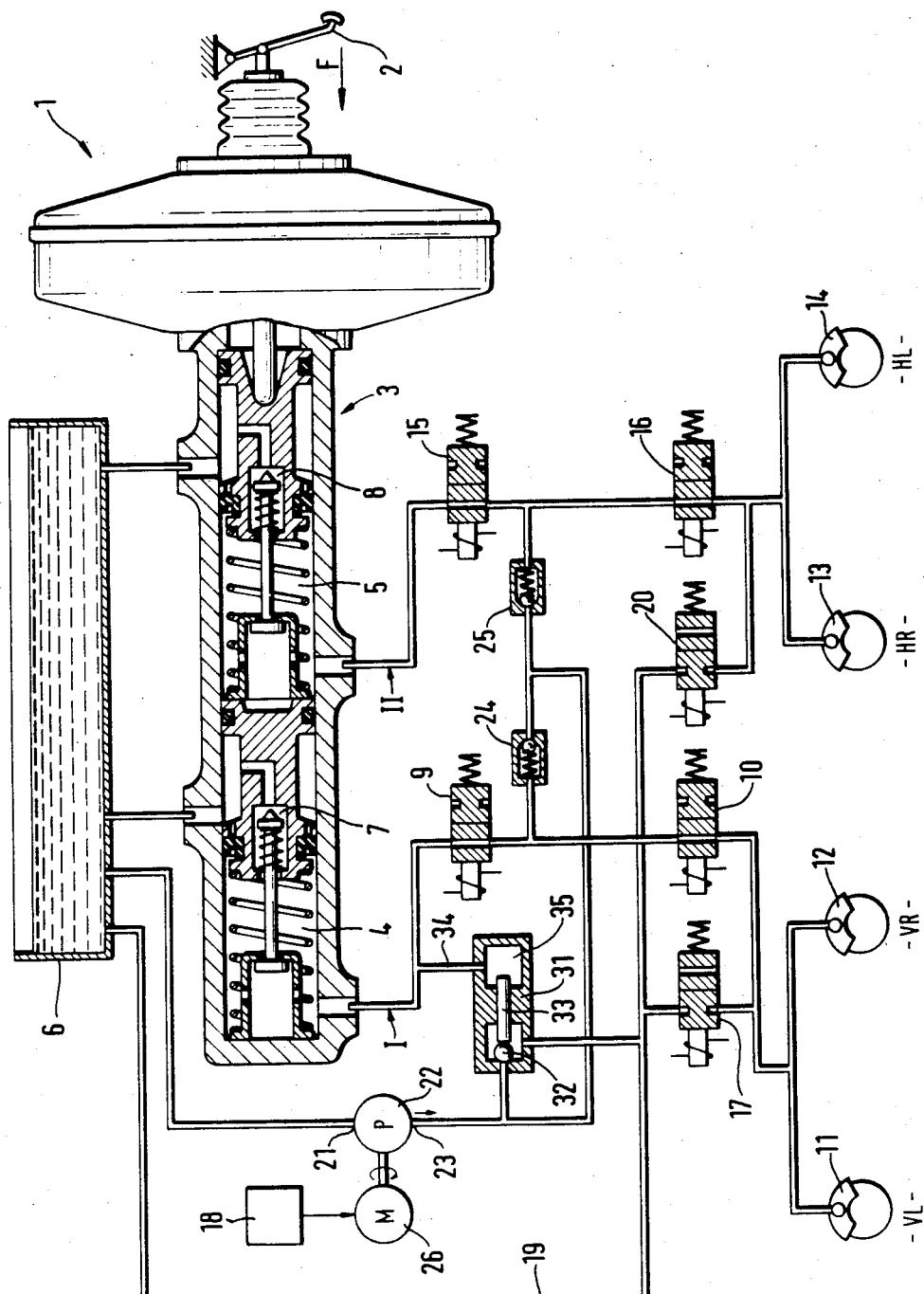
FIG. 1 is a brake system comprising two brake circuits independent of one another in accordance with the present invention; and, FIG. 2 is a schematic view of a three-circuit brake system in accordance with the present invention.

In FIG. 1, reference numeral 1 designates a brake power booster which is actuatable by way of a brake pedal 2. connected downstream of the brake power booster 1 is a tandem master cylinder 3 containing two working chambers 4, 5, each of the working chambers 4, 5 supplying one brake circuit I and II, respectively, with pressure fluid. In the non-actuated condition of the brake unit 1, 3, the working chambers 4, 5 are in communication with an unpressurized supply reservoir 6, the communication being adapted to be shut off by central valves 7, 8 in the event of brake application.

The working chamber 4 is in communication with wheel brakes 11, 12 by way of normally opened two-way/two-position directional valve 9 and a normally opened two-way/two-position directional valve 10, the wheel brakes 11, 12 being located at the front axle of the automotive vehicle, for instance. In a similar manner, there is a connection between the working chamber 5 and wheel brakes 13, 14 by way of two normally opened two-way/two-position directional valves 15, 16. Furthermore, a two-way/two-position directional valve 17 is connected to the wheel brakes 11, 12 of the front axle of the automotive vehicle, which valve normally assumes a closed position and can be switched by a slip-monitoring electronics 18 to adopt a position, in which a connection can be established between the wheel brakes 11, 12 and the unpressurized supply reservoir 6 by way of the line 19. A two-way/two-position directional valve 20 is connected the same way to the wheel brakes 13, 14 of the rear axle of the automotive vehicle, said valve corresponding in its design and its function to the valve 17.

Connected to the unpressurized supply reservoir 6 is the suction side 21 of a pressure fluid pump 22. Connected downstream thereof is a pressure control valve 31 with a valve member 32. The pressure side 23 is connected to the brake circuits I, II by way of non-return valves 24, 25. Pressure fluid pump 22 is adapted to be driven by an electric motor 26 which, in turn, can be switched on and off by the slip-monitoring electronics 18.

The mode of operation of the brake system described will be explained in more detail, starting from the condition of brake release, in which all movable parts as well as the valves 9, 15, 17, 10, 20, 16 assume the position to be seen from the drawing. When an actuating force is applied on the brake pedal, 2, the working chambers 4, 5 of the tandem master cylinder (while being correspondingly assisted by the brake power booster 1) will be pressurized after closing of the central valves 7, 8. the pressure which is now prevailing in the working chambers 4, 5 of the tandem master cylinder 3 propagates into the brake circuits I, II and by way of the two-way/two-position directional valves 9, 15, 10, 16 to the wheel brakes 11, 12, 13, 14 of the automotive vehicle so that a corresponding braking effect is performed.

The rotational behavior of the vehicle wheels 11, 12, 13, 14 is sensed by appropriate sensors (not shown) which issue their output signals to the slip-monitoring electronics 18 which controls the electric motor 26 of the pressure fluid pump 22 and which is in a position to bring about change-over of the two-way/two-position directional valves 9, 15, 16, 20, 17.

It shall be assumed for instance that the vehicle wheel allocated to the wheel brake 11 has reached a critical slip value. When the slip-monitoring electronics 18 detects a like rotational condition at the vehicle wheel allocated to wheel brake 11, the drive 26 of the pressure fluid pump 22 will be put into operation. Simultaneously, the two-way/two-position directional valves 9, 10 switch to a closed position, thereby interrupting a hydraulic connection between the working chamber 4 and the wheel brakes 11, 12 of the automotive vehicle. If a like phase of maintaining the pressure constant at the wheel brakes 11, 12 of the automotive vehicle does not suffice to stabiize the rotational behavior of the vehicle wheels so as to bring about uncritical slip values again, the slip-monitoring electronics 18 will also switch the two-way/two-position directional valve 17 over to an opened position. As a result, pressure fluid is removed from the wheel brakes 11, 12, and a corresponding reduction of the braking effect takes place.

As has been described, the two-way/two-position directional valve 9 is in its closed position in a like operating condition so that the working chamber 4 of the tandem master cylinder 3 is shut off hydraulically and a minimum volume remains enclosed in the working chamber 4 in any case. In the event of pressure fluid removal from the brake circuit I, the pressure fluid that is discharged to the unpressurized supply reservoir 6 will be replenished by the pressure fluid pump 22 through the non-return valve 24. Herein, the valve member 32 of the pressure control valve 31, by way of the tappet 33, is acted upon by the pressure in the working chamber 4, since the latter communictes by way of the pressure line 34 with the valve chamber 35 into which the tappet 33 is projecting. A similar mode of operation results, if critical slip values occur at any one or at both of the vehicle wheels assigned to the wheel brakes 13, 14. In the state of brake release, all parts will re-assume their position illustrated in the drawing.

Figure 2:
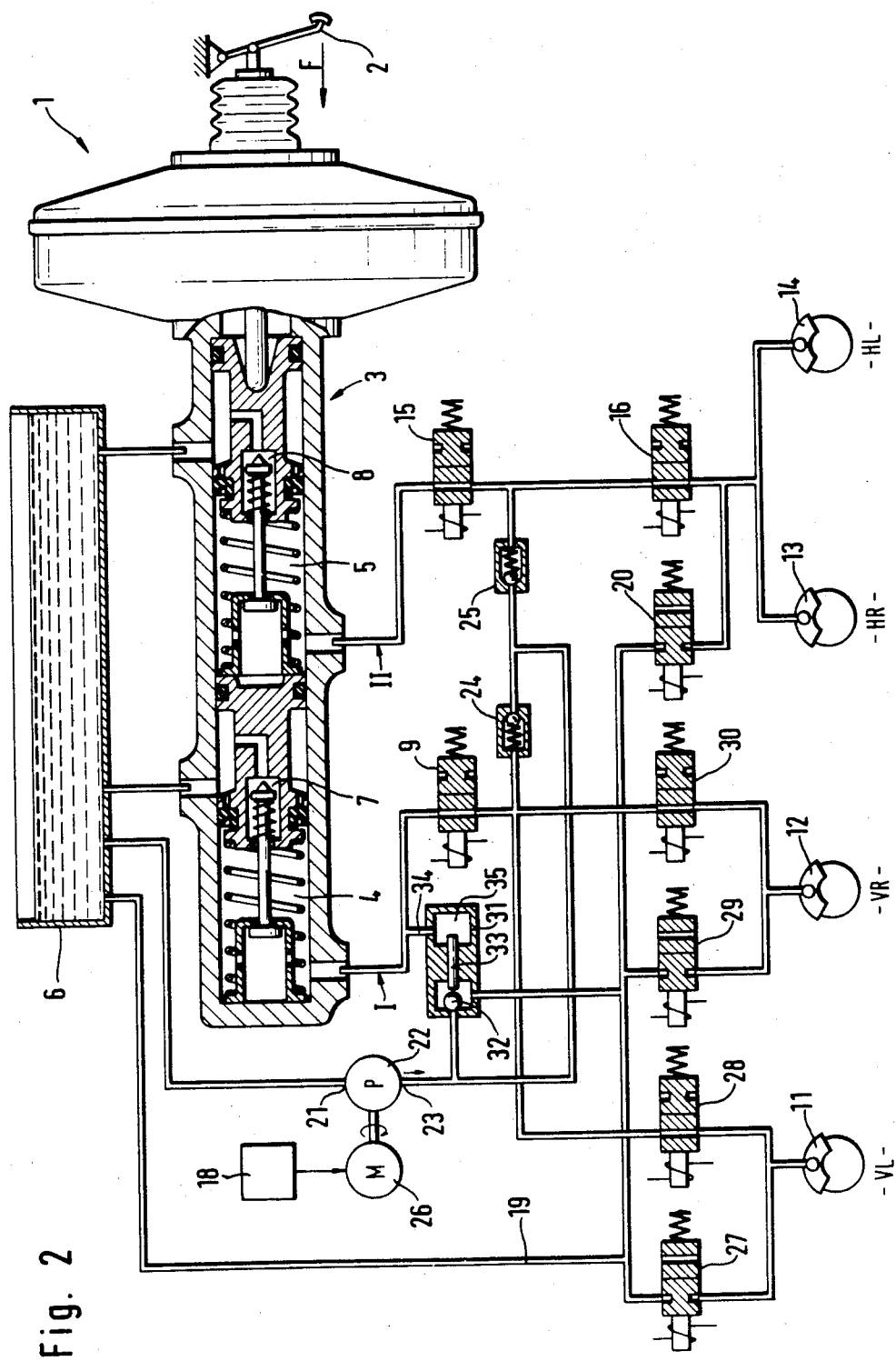

The brake system illustrated in FIG. 2 differs from the brake system according to FIG. 1 exclusively by the fact that valve means 27, 28, 29, 30 are assigned to each wheel brake 11, 12 of the front axle of the automotive vehicle which permit to control the braking presures in the wheel brakes 11, 12 independently of one another. There are no other differences with respect to function so that a repeated description of the mode of operation is unnecessary.

What is claimed is:

1. A vehicular hydraulic brake system with an anti-locking arrangement, said system comprising a master cylinder for connection to and operation by a brake pedal, brake actuating members connected to said master cylinder for receiving pressure fluid from said master cylinder, first valve means between said master cylinder and said brake actuating members, said first valve means including normally open directional control valve means for connecting or disconnecting said brake actuating members to said master cylinder and further having a normally closed directional control valve means for selectively connecting said brake actuating members to an unpressurized reservoir when said normally open directional control valve means is closed, replenishing means for assuring availability of pressure fluid at the brake actuating members, said replenishing means including shut-off valve means between said master cylinder and said normally open directional control valve means, said shut-off valve means being operative with said normally open directional control valve so that said shut-off valve means is open or closed in correspondence with said normally open directional control valve means, and an auxiliary pressure source and second valve means connected to discharge fluid pressure between said shut-off valve means and said normally open directional control valve means for providing fluid pressure for assuring the availability of a fluid pressure reserve proportional to the pressure from the master cylinder, the auxiliary pressure source comprises an electromotively drivable pressure fluid pump and a pressure control valve connected downsteam thereof, said pressure control valve includes a valve member for controlling the pressure of the pump flow and which is acted upon by the master cylinder pressure.

2. A vehicular hydraulic brake system as claimed in claim 1, wherein the shut-off valve means is controllable electromagnetically.

3. A vehicular hydraulic brake system as claimed in claim 2, wherein the master cylinder includes a plurality of working chambers with one shut-off valve means being connected downstream of each working chamber.

4. A vehicular hydraulic brake system as claimed in claim 1, wherein the valve member controlling pressure of the pump flow is acted upon by the pressure of an auxiliary cylinder actuated by the brake pedal.

5. A vehicular hydraulic brake system as claimed in claim 1, including a valve member for controlling the pressure of the pump flow and which is operatively connectd with the brake pedal (2).

* * * * *